April 5, 1960
J. S. WREFORD
2,931,850
LIQUID-COOLED WELDING CABLE
Filed May 21, 1956
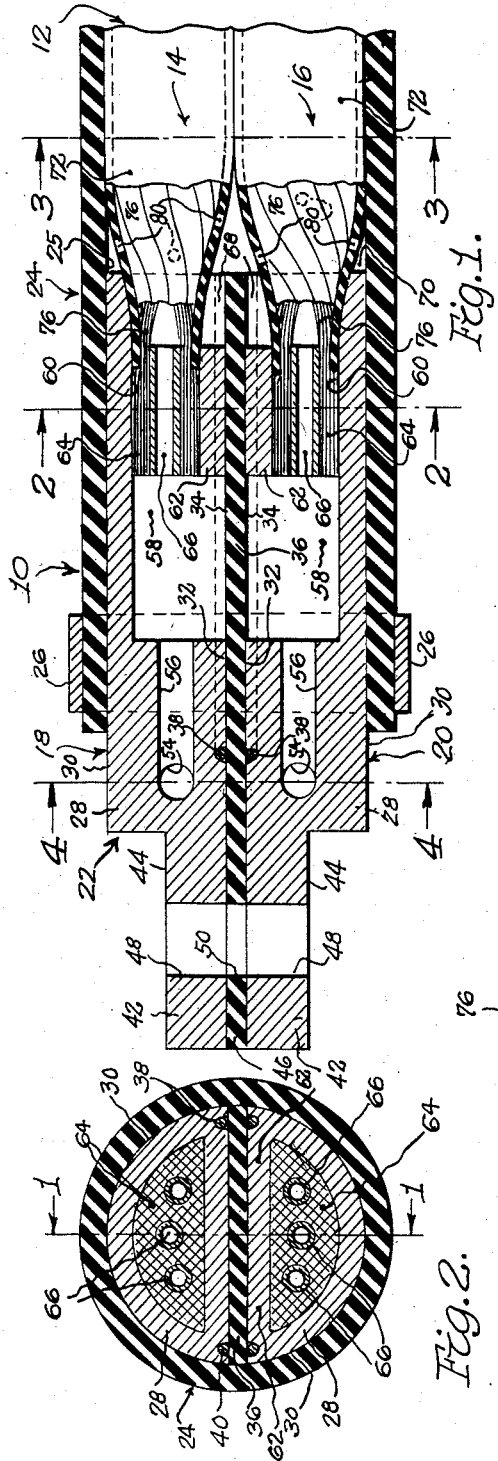
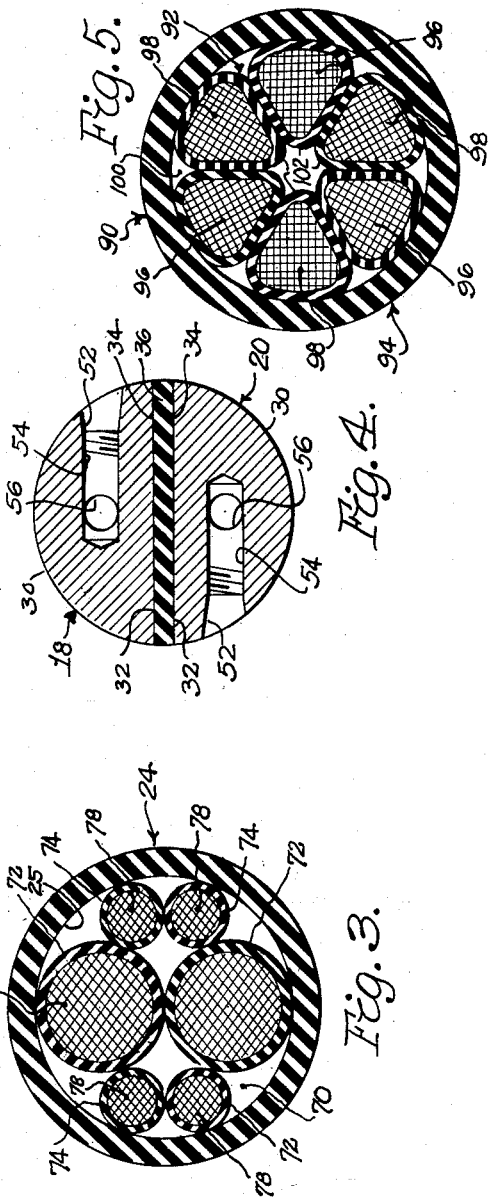
INVENTOR.
John S. Wreford
BY Barthel + Bugbee
Attys

United States Patent Office 2,931,850
Patented Apr. 5, 1960

2,931,850

LIQUID-COOLED WELDING CABLE

John S. Wreford, Franklin, Mich., assignor to Gar Wood Industries, Inc., Wayne, Mich., a corporation of Michigan Application May 21, 1956, Serial No. 586,305

4 Claims. (Cl. 174—15)

This invention relates to welding cables and, in particular, to liquid-cooled welding cables.

One object of this invention is to provide a liquid-cooled welding cable composed of a plurality of welding current conductors, each in the form of a bundle containing a very large number of strands of very fine wire, each bundle being encased in a flexible tube of insulating material, such as natural or synthetic rubber or flexible synthetic plastic, which not only serves to electrically insulate the conductors from one another but also serves to carry cooling liquid, such as water, through the minute spaces between the multiple strands of wire of which each conductor is composed, thereby most efficiently cooling the conductor.

Another object is to provide a liquid-cooled welding cable of the foregoing character wherein the major portion of the cooling liquid, such as water, is caused to traverse the conductor-encasing tubes to cool the conductors but wherein a minor portion of the liquid is permitted to escape into the spaces between the conductor tubes within the interior of the cable casing or hose, thereby subjecting the walls of the tubes to substantially balanced external and internal hydraulic pressures so the elasticity of the tubes causes them to closely constrict the conductors, with the result that tiny slivers of wire formed by the breakage of strands are restrained from "migrating" or traveling endwise of the tubes and clogging the water outlet passageways, as has occurred frequently in prior water-cooled cables.

Another object is to provide a liquid-cooled welding cable of the foregoing character wherein the conductor insulating tubes are of a relatively slippery material, such as a relatively slippery flexible natural or synthetic rubber or synthetic plastic material, which reduces to a minimum the friction between them and consequently enables them to slide slightly relatively to one another when the cable is flexed during operation, this in turn facilitating handling of the welding gun and welding cable connected to it on an assembly line or the like.

Another object is to provide a liquid-cooled welding cable of the foregoing character wherein the encasing tubes of the conductor, in insulating the conductors electrically from one another as well as carrying the cooling liquid, enable the complete elimination of the so-called insulating separator or insulating strip formerly running from end to end of the cable and insulating from one another the conductors or conductor assemblies of opposite instantaneous polarities.

Another object is to provide a liquid-cooled welding cable of the foregoing character which eliminates the flexible metallic porous cooling liquid tubes previously inserted in the centers of the conductor bundles for carrying the cooling liquid, such as water, these tubes having been employed to prevent splinters of wire from getting into the cooling liquid stream but having resulted in cutting down the cross-sectional area of conductor wire and consequently having reduced the electrical carrying capacity of the cable and decreased its flexibility.

Another object is to provide a liquid-cooled welding cable of the foregoing character wherein there are multiple conductors arranged in alternate instantaneous polarities adjacent one another within the cable hose or casing, each conductor being encased in a flexible insulating tube which not only carries the cooling liquid for each conductor but also insulates it from the adjacent conductors of opposite instantaneous polarities, the tubes for the conductors of one polarity being connected to the liquid cooling passageways of one terminal, whereas those of the opposite polarity are connected to the liquid cooling passageways of the other terminal.

Other objects and advantages of the invention will become apparent during the course of the following description of the accompanying drawings, wherein:

Figure 1 is a central longitudinal section through the forward end of a liquid-cooled welding cable and the terminals of the cable head, according to one form of the invention, taken along the line 1—1 in Figure 2;

Figure 2 is a cross-section taken along the line 2—2 in Figure 1, showing the cooling liquid passageways into the conductor-encasing tubes;

Figure 3 is a cross-section taken along the line 3—3 in Figure 1, showing the relationship of the conductor bundles and their encasing tubes;

Figure 4 is a cross-section through the cable head taken along the line 4—4 in Figure 1, showing the cooling liquid inlet passageways therein; and Figure 5 is a cross-section similar to Figure 3, but showing a modification in which there are multiple conductors arranged in alternate instantaneous polarities, each being encased in a flexible insulating and liquid-carrying tube.

Referring to the drawing in detail, Figure 1 shows a welding cable, generally designated 10, according to one form of the invention consisting generally of a so-called cable winding, generally designated 12, the two conductor assemblies 14 and 16 of which are connected respectively to the separate terminals 18 and 20 of the so-called cable head 22. There are two such cable heads 22, one at each end of the cable 10, both being of similar construction, hence a description of one is sufficient for both. The cable head 22 and the conductor assemblies 14 and 16 connected thereto are housed in a cable casing or hose 24 preferably of natural or synthetic rubber. The cable heads 22 are inserted snugly in the bore 25 of the hose 24 and clamped in water-tight relationship by one or more annular clamping bands or rings 26. The conductor assemblies 14 and 16 and their respective terminals 18 and 20 are of opposite instantaneous polarities during the operation of the welding cable 10, the term "instantaneous polarities" being employed because the current actually used in welding is alternating current of a relatively low voltage, such as in the neighborhood of six volts, at a very high amperage, frequently from 10,000 to 50,000 amperes.

The terminals 18 and 20 of the cable head 22 are approximately semi-cylindrical bodies of conducting material, such as copper, having semi-cylindrical main portions 28 with semi-cylindrical outer surfaces 30. The terminals 18 and 20 have substantially flat inner surfaces 32 engaging the flat opposite sides 34 of an insulating strip 36 of any suitable insulating material, such as insulating fiber. In order to render the junction between the contacting surfaces 32 and 34 of the main portion 28 of the terminals 18, 20 and the insulating strip 36 liquid-tight, the surfaces 32 are provided with approximately U-shaped grooves 38 (Figures 1 and 2) in which are seated elongated cord-like resilient gaskets 40 of natural or synthetic rubber. These engage the surfaces 34 of the insulating strip 36 and prevent leakage. Projecting forwardly from the main portions 30 of the terminals 18 and 20 are forward or nose portions 42 having flattened outer surfaces 44 adapted to fit between connection lugs (not shown) of conventional welding apparatus, such as a welding gun or a welding transformer. The forward portions 42 of the terminals 18 and 20 and the forward portion 46 of the insulating strip 36 have aligned holes 48 and 50 respectively for the passage of a clamping bolt (not shown) by which the cable head 22 is clamped to the connection lugs of the welding apparatus.

Each of the terminals 18 and 20 has water connection ports 52 for connection to flexible water inlet or outlet pipes (not shown) and opening at its inner end into transverse passageways 54 (Figure 4). The latter at their inner ends open into the forward ends of longitudinal passageways 56, the rearward ends of which open into longitudinal cooling liquids chambers 58. The chambers 58 at their rearward ends terminate in open-ended pockets 60 bounded on their inner sides adjacent the insulating strip 36 by bridge portions 62 integral with the remainder of the terminal 18 or 20. The pocket 60 contain the compressed common end portions 64 of the conductor assemblies 14 and 16, the strands of which are united to one another in a substantially solid mass either by compression alone or by the use of an intermediate metal, such as silver solder. Each cable conductor assembly end 64 has a plurality of conduits 66 disposed therein and passing therethrough. The conduits 66 may consist of separate tubes, as shown, or merely of passageways through the conductor assembly ends 64 formed by inserting subsequently removed rods at these locations during compression. Behind the conductor assembly end portions 64 are located recesses or cavities 68 disposed on opposite sides of the rearward end of the insulator strip 36. These cavities 68 open into the hose chamber or interior 70 (Figures 1 and 3) located within the hose bore 25.

Each of the conduits 66 at its rearward end opens into either a large diameter flexible insulating tube 72 or into one of a pair of small diameter flexible insulating tubes 74 located one on each side thereof (Figure 3), the outer ends of these tubes 72 and 74 having a connection with the rearward end of the conduits 66 (Figure 1) so that water flows from the chambers 58 through the conduits 66 directly into the flexible insulating tubes 72 or 74. The large diameter insulating tubes 72 contain large diameter conductor bundles or ropes 76, whereas the smaller diameter tubes 74 contain smaller diameter bundles or ropes 78. The sizes of the tubes 72 and 74 are such as to snugly encase their respective conductor bundles 76 and 78.

The flexible insulating tubes 72 and 74 are of any suitable material, such as that generally known as an elastomer, this being a generic term for rubber-like material such as natural or synthetic rubber or materials having rubber-like properties otherwise known as elastic deformable materials. These materials are good electrical insulators, are very flexible and slide easily relatively to one another with a minimum of friction, particularly when they are lubricated by the presence of the cooling water. Each tube 72 or 74 is preferably of impervious material so as to retain the cooling liquid therein, but a few tiny bleed holes 80 are preferably provided to permit cooling liquid to enter and fill up the hose chamber 70 around the various tubes 72 and 74 and equalize the pressure on the outer and inner walls of these tubes. This arrangement by thus balancing the external and internal hydraulic pressures on the walls of the tubes 72 and 74, prevents distention or "engagement" of the tubes 72 and 74 by the internal pressure of the cooling liquid passing through them, and thus causes the elasticity of the elastic deformable material of which they are made to continue, during flow of cooling liquid, to hold the walls of the tubes 72 snugly against their respective conductor bundles 76 and 78 and consequently to snugly engage the tiny wire strands thereof. As a result, if splinters of wire are formed by the breakage of these strands, these splinters do not migrate as a result of the water flow through the tubes 72 and 74, but remain held substantially in their locations where they were detached, thereby avoiding clogging the cooling liquid passageways.

As previously stated, the conductor bundles 76 and 78 are formed of ropes of large numbers of very tiny wires braided together but rather loosely packed in order to provide interstices between the strands for the passage of cooling liquid, such as water. The bleed holes 80 are small both in size and number, so as to prevent any considerable part of the cooling water from being diverted into the hose chamber 70, other than to balance the pressures on opposite sides of the walls of the tubes 72 and 74. Since cooling liquid, like any liquid, tends to follow the path of least resistance, it is unwise to provide for a large flow of liquid through the hose chamber 70, since this would divert cooling water from passing through the locations where heat is actually developed, namely in the conductor bundles 76 and 78 within the tubes 72 and 74. This heat is, of course, developed as a result of the passage of electricity during welding, through the action of the electrical resistance of the material, such as copper, of which the wire strands of the conductor bundles 76 and 78 are formed.

Thus, each conductor assembly 14 and 16 consists of a large diameter central conductor bundle 76 in its tube 72 and a pair of small diameter conductor bundles 78 in their small diameter tubes 74 located one on each side of the large diameter central conductor bundle 76 (Figure 3). This arrangement, when the conductor bundles are packed into the hose chamber 70, causes each of the conductor assemblies 14 and 16 to be of approximately semi-circular cross-section, with the interfaces between the conductor assemblies 14 and 16 arranged approximately along a diametral plane of the hose bore 25. The result is that the electrical reactance causing repulsion between the conductors of opposite polarity during the welding operation is reduced, in contrast with the repulsion between a pair of large single conductors of circular cross-section, and consequently the "kick" resulting from such reactance is likewise reduced. Moreover, the provision of the insulating tubes 72 and 74 with their comparatively thin walls enables the conductor bundles 76 and 78 of opposite polarities to approach one another to the minimum separations, while still maintaining electrical insulation between them, thereby still further reducing the reactance and mutual repulsion and correspondingly increasing the electrical efficiency of the cables. At the same time, the elongated rubber separator which was formerly used between the conductor bundles is completely eliminated and with it the increased reactance, repulsion and "kick" resulting from the wider separations of the opposite-polarity conductor assemblies 14 and 16.

In the operation of the invention, the forward portions 42 of the terminals 18 and 20 of the cable heads 22 are bolted to the connection lugs respectively of the welding transformer or welding gun or machine, as the case may be, and flexible pipes for cooling liquid, such as water, connected to the ports 52 to cause cooling liquid to flow through the interior of the cable 10. When a weld is made, the consequent flow of high amperage electricity causes the conductor bundles 76 and 78 of the conductor assemblies 14 and 16 to heat up because of the electrical resistance of the copper or other material of which their wire strands are made, but the flow of water or other cooling liquid through the interior of the tubes 72 and 74 carries away the heat and maintains the conductors at a comparatively cool working temperature. It will be understood that cooling is imperative in such cables carrying high amperage currents, and that if the cooling is interrupted, even for a very short period of time, the wire strands heat up and fuse to one another, burning up the insulation and ruining the cable.

In particular, assuming the upper port 52 (Figure 4) to be the cooling liquid inlet port and the lower port 52 to be the outlet port, the water or other cooling liquid under pressure enters through the upper right-hand port of Figure 4, passes through the transverse and longitudinal passageways 54 and 56 into the upper water chamber 58 (Figure 1), thence through the conduits 66 into the interior of the insulating tubes 72 or 74. Here a small portion of the water is diverted through the bleed holes 80 to fill the hose chamber 60 around the outsides of the tubes 72 and 74, maintaining a standard hydraulic pressure thereagainst, in order to cause them to snugly embrace the conductor bundles 76 and 78.

This construction of the conductor bundles 76 and 78 by their respective tubes 72 and 74 substantially prevents the migration of any wire splinters which may be detached from the conductors during operation. These splinters occur principally because of the flexing of the cable 10 as the operator drags it over the floor or equipment while he is moving from one part of the workpiece to the other, such as in welding various portions of an automobile body upon a moving assembly line. The present invention substantially prevents these splinters from traveling lengthwise of the tubes in response to the flow of water through the tubes, thereby preventing clogging of water outlets. The major part of the water passes through the interior of the tubes 72 and 74 of the upper conductor assembly 14, thence to the opposite end of the cable 10 to the similar cable head 22 therein (not shown), returning through the tubes 72 and 74 of the lower cable assembly 16 to the lower conduit 66, the lower chamber 58, the lower longitudinal and transverse passageways 56 and 54 and out through the lower outlet port 52 (Figure 4).

The terms "upper" and "lower" applied to the conductor assemblies 14 and 16 are purely relative since the conductor assemblies 14 and 16 are twisted lengthwise from one end of the cable to the other, in order to increase its uniformity of flexing during handling, hence the conductor assemblies 14 and 16 turn through several revolutions from one end to the other of many such cables.

The modified welding cable, generally designated 90, shown in Figure 5 has a cable winding 92 encased in a casing or hose 94 of insulating material, such as natural or synthetic rubber. The winding 92 consists of multiple conductors 96 and 98 of loosely-packed very fine wire such as copper wire twisted into wire ropes and arranged in alternating instantaneous polarity around the interior chamber 100 of the hose or casing 94. For example, at a given instant, the conductors 96 may be of positive polarity and the conductors 98 of negative polarity, but since the welding current ordinarily employed is alternating current, the polarity alternates rapidly in accordance with the alternation of the current.

Each of the conductors 96 and 98 is encased in an insulating tube 102. In the example shown, there are three conductors of each polarity making six conductors 96 and 98 to occupy the cylindrical casing chamber 100, wtih the result that each conductor assumes an approximately triangular cross-section with rounded corners, with the apices of the triangles facing toward the center line of the chamber 100. This construction enables the tubes 102 for the conductors 96 of one polarity to be connected to the cooling liquid conduits 66 of one terminal 18, whereas the tubes 102 of the other polarity conductors 98 are connected to the cooling liquid conduits 66 of the other terminal 20. Extension rings are optionally used behind the terminals 18 and 20, if necessary, to interconnect the three conductors of each polarity, these rings in turn being connected to their respective terminals 18 and 20. Bleed holes (not shown), similar to the bleed holes 80 are preferably formed in the cooling liquid and insulating tubes 102 to maintain a standing hydraulic pressure outside the tubes 102 within the casing chamber 100 so as to balance the itnernal and external pressures on the walls of the tubes 102, so that their elasticity causes the tubes 102 to snugly engage the wire strands of their respective conductors 96 and 98 to prevent migration of wire splinters lengthwise along the tubes 102 as explained above in connection with the welding cable 10 shown in Figures 1 to 4 inclusive.

In the operation of the modified welding cable 90, connections are made as described above in accordance with the operation of the welding cable 10, and cooling liquid caused to pass through the tubes 102 circulating through the interstices of the wire strands. When welding takes place, the heat created by the resistance to the passage of electric current is carried away by the cooling liquid circulated through the tubes 102, while the elasticity of the walls of the flexible tubes 102, as previously stated, firmly urges the flexible tubes 102 against their respective wire stranded conductors 96 and 98 with the result that wire splinters, if formed, tend to remain near the place of their detachment and do not travel lengthwise to the terminals to clog the liquid passageways thereof.

During the operation of the modified cable 90, the alternate polarities of the conductors 96 and 98 reduce the reactance between them to a minimum and consequently also reduce the repulsion or "kick" between them to a minimum. This reactance and the corresponding repulsion or kick are further reduced by the close approach of the conductors 96 and 98 to one another because of the thinness of the walls of the flexible tubes 102 insulating them from one another as well as carrying the cooling liquid. The result is a well-cooled cable of exceptional electrical efficiency and with a high current-carrying capacity due to the exceptionally large proportion of the cross-sectional area which is occupied by the cross-sections of the current-carrying conductors 96 and 98 and the correspondingly small proportionate space within the cable casing chamber 100 occupied by the tubes 102 and the space left empty.

What I claim is:

1. A liquid-cooled welding cable comprising a tubular welding cable casing, a pair of electrical connection terminals disposed in one end of said casing with their forward portions projecting outwardly therefrom for external connection to welding apparatus, each terminal having a cooling liquid passageway therethrough and a welding conductor attachment portion communicating with said passageway, a flexible loosely-packed stranded wire conductor assembly connected to each attachment portion and extending inwardly therefrom through said casing, each assembly including a plurality of flexible loosely-packed stranded wire conductor bundles disposed side by side with their center lines spaced laterally apart from one another, a liquid-carrying flexible tube of elastic deformable insulating material snugly encasing each conductor bundle and secured to each terminal in communication with its respective passageway, and means comprising bleed holes in said tubes for admitting liquid under pressure to the space in said casing externally of said tubes whereby to substantially balance the external and internal hydraulic pressures against the walls of said tubes and thereby cause the elasticity thereof to urge the walls of said tubes into snug engagement with their respective conductors.

2. A liquid-cooled welding cable comprising a tubular welding cable casing, a pair of electrical connection terminals disposed in one end of said casing with their forward portions projecting outwardly therefrom for external connection to welding apparatus, each terminal having a cooling liquid passageway therethrough and a welding conductor attachment portion communicating with said passageway, a flexible loosely-packed stranded wire conductor assembly connected to each attachment portion and extending inwardly therefrom through said casing, each assembly including a plurality of flexible loosely-packed stranded wire conductor bundles disposed side by side with their center lines spaced laterally apart from one another, and a liquid-carrying flexible tube of insulating material encasing each conductor bundle and secured to each terminal in communication with its respective passageway, said assemblies being disposed on opposite sides of the medial plane of said casing and having their tube directly engaging one another.

3. A liquid-cooled welding cable comprising a tubular welding cable casing, a pair of electrical connection terminals disposed in one end of said casing with their forward portion projecting outwardly therefrom for external connection to welding apparatus, each terminal having a main cooling liquid passageway therethrough and a welding conductor attachment portion having therein an extension of said main liquid passageway communicating with said main liquid passageway, a multiplicity of flexible loosely packed stranded wire conductors of approximately sector-shaped cross-section disposed around the interior of said casing with their center lines spaced laterally apart from one another and connected in alternating sequence to said terminals for effecting alternating sequence of instantaneous polarity of said conductors around the interior of said casing, said conductors extending lengthwise through said casing, and a liquid-carrying flexible tube of insulating material and of approximately sector-shaped cross-section encasing each conductor and secured to its respective terminal in communication with the extension liquid passageway thereof.

4. A liquid-cooled welding cable comprising a tubular welding cable casing, a pair of electrical connection terminals disposed in one end of said casing with their forward portion projecting outwardly therefrom for external connection to welding apparatus, each terminal having a main cooling liquid passageway therethrough and a welding conductor attachment portion having therein an extension of said main liquid passageway communicating with said main liquid passageway, a multiplicity of flexible loosely packed stranded wire conductors disposed around the interior of said casing with their center lines spaced laterally apart from one another and connected in alternating sequence to said terminals for effecting alternating sequence of instantaneous polarity of said conductors around the interior of said casing, said conductors extending lengthwise through said casing, a liquid-carrying flexible tube of elastic deformable insulating material snugly encasing each conductor and secured to its respective terminal in communication with the extension liquid passageway thereof, and means comprising bleed holes in said tubes for admitting liquid under pressure to the space in said casing externally of said tubes whereby to substantially balance the external and internal hydraulic pressures against the walls of said tubes and thereby cause the elasticity thereof to urge the walls of said tubes into snug engagement with their respective conductors.

References Cited in the file of this patent

UNITED STATES PATENTS

| | | |
|---|---|---|
| 1,987,971 | Peterson | Jan. 15, 1935 |
| 2,188,178 | Eby | Jan. 23, 1940 |
| 2,234,435 | Johnson | Mar. 11, 1941 |
| 2,371,185 | Purat | Mar. 13, 1945 |
| 2,691,691 | Wreford | Oct. 12, 1954 |
| 2,702,311 | Botterill et al. | Feb. 15, 1955 |
| 2,766,806 | Rothermel | Oct. 16, 1956 |
| 2,835,721 | Leathers | May 20, 1958 |

FOREIGN PATENTS

| | | |
|---|---|---|
| 138,935 | Austria | Oct. 10, 1934 |